United States Patent [19]
Vandenberg

[11] Patent Number: 5,142,882
[45] Date of Patent: Sep. 1, 1992

[54] SOLAR HEAT PUMP

[76] Inventor: Leonard B. Vandenberg, 710 Sanders Ave., Scotia, N.Y. 12302

[21] Appl. No.: 319,281

[22] Filed: Mar. 6, 1989

Related U.S. Application Data

[63] Continuation-in-part and division of Ser. No. 611,197, May 17, 1984, Pat. No. 4,809,523.

[51] Int. Cl.⁵ ............................................. F25B 27/00
[52] U.S. Cl. .................................. 62/235.1; 62/500; 126/432; 126/441
[58] Field of Search ............. 62/500, 483, 235.1, 62/238.3, 238.4, 238.6, 268, 496, 481; 126/427, 432, 441, 449; 417/118

[56] References Cited

U.S. PATENT DOCUMENTS

| | | | |
|---|---|---|---|
| 3,680,327 | 8/1972 | Stein | 62/500 |
| 4,173,994 | 11/1979 | Hiser | 62/500 |

*Primary Examiner*—Henry A. Bennett

[57] ABSTRACT

A heat transfer system combining a solar collector and a vapor jet compressor pump. The solar collector provides two streams of heated vapor, one at a relatively high temperature and one at a relatively low temperature. The high temperature vapor provides the motive vapor for the vapor jet compressor pump. The vapor jet compressor pump entrains the lower temperature vapor and acts as a heat pump effectively pumping its temperature to a higher temperature useful for space heating. The solar energy supply may be supplemented by an auxiliary convention energy source and the vapor jet compressor pump may be supplemented by a self-energized circulation pump.

15 Claims, 3 Drawing Sheets

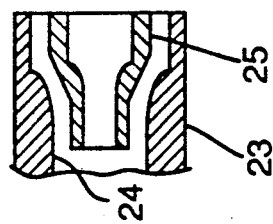
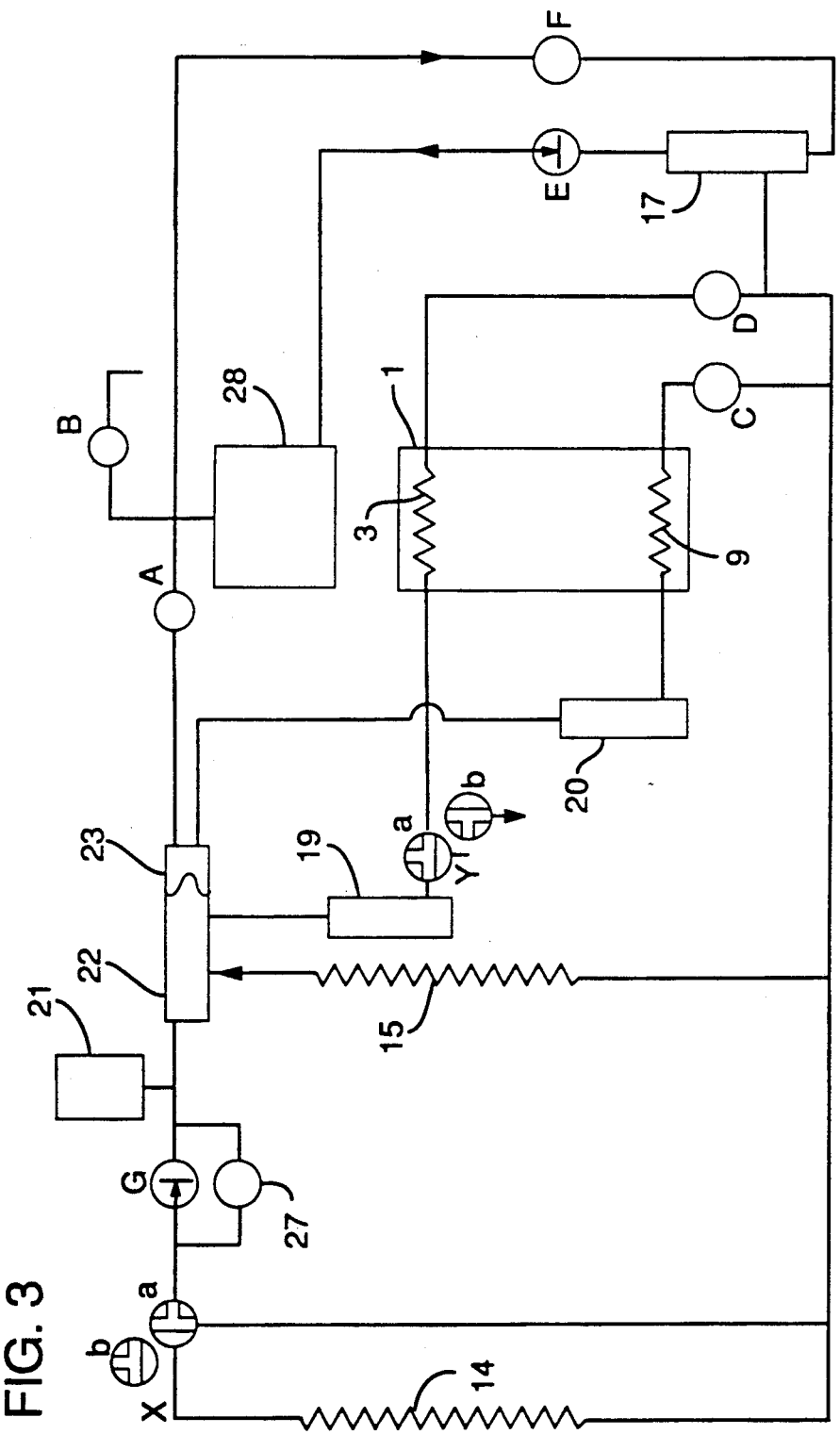

SOLAR HEAT PUMP

RELATED APPLICATIONS

This application is a divisional and continuation in part of applicant's Ser. No. 611,197 filed May 17, 1984 and expected to be issued Mar. 7, 1989 as U.S. Pat. No. 4,809,523, entitled Thermal Cooling and Heat Transfer System. The specification of Ser. No. 611,197 is incorporated herein by reference.

BACKGROUND OF THE INVENTION

This invention pertains to an apparatus and method for collecting solar energy and using it to heat or cool space. More particularly, this invention pertains to a solar heat pump that collects at low temperatures solar heat that would be lost by conventional collectors and increases the temperature thereof, by means of a heat pump so as to render it useful for space heating. This invention also relates to the use of a vapor jet compressor pump as a heat pump in conjunction with a thermal barrier solar collector.

U.S. Pat. No. 4,809,523 describes art relating to the heating or cooling of a heat transfer medium involving vaporization of a portion of the fluid.

OBJECTS OF THE INVENTION

It is an object of the present invention to provide a combination of a solar collector and a vapor jet compressor pump that together have a capability for nearly 100% thermal collection efficiency.

It is another object of the present invention to provide a collector that when operated in conjunction with a vapor jet compressor pump and an auxiliary energy supply can provide thermal energy for useful purposes when competing collectors are useless because the temperatures are too low for useful heating of space.

It is another object of the present invention to provide a solar energy system that needs no storage capability because it can work equally well with an auxiliary fuel supplying energy to the system.

It is an object of the present invention to provide a combined solar and auxiliary energy system which provides reliable 24 hour operation irrespective of weather conditions.

It is an object of the present invention to provide a solar energy system that makes use of solar energy at collected temperatures as low as 40 F when an auxiliary energy supply is used.

It is an object of the present invention to provide a solar energy system that can operate in the self-energized mode in the advent of a power failure.

It is an object of the present invention to provide a solar energy system that supplies both heating and cooling of space.

SUMMARY OF THE INVENTION

The present invention is directed to the combination of a vapor jet compressor pump which acts both as a heat pump and as a heat transfer fluid pump simultaneously, and a thermal barrier solar collector which collects solar energy at a high temperature for providing motive steam for the vapor jet compressor pump and collects solar energy at a low temperature for providing a supply of low pressure vapor for the heat pump. High temperature vapor from the thermal barrier solar collector motivates the vapor jet compressor pump which in turn pumps heat from the lower temperature thermal barrier of the solar collector. The combined motive and barrier heat from the thermal barrier solar collector heats the heat transfer medium being circulated by the vapor jet compressor pump to provide useful heat for space heating. The combination provides a self-energized system for the heating and cooling of space.

The invention is further directed to a heat transfer apparatus which includes a first vapor jet compressor pump having a motive vapor inlet, a feed liquid inlet, a low pressure vapor inlet and a discharge outlet; a second vapor jet compressor pump also having a motive vapor inlet, a feed liquid inlet, a low pressure vapor inlet and a discharge outlet; means, such as the thermal barrier solar collector, for providing a first source of heated vapor at a relatively high temperature and a second source of heated vapor at a relatively low temperature; operative connection of the motive vapor inlets of the first and second vapor jet compressor pumps to the first source of heated vapor; operative connection of the discharge outlet of the first vapor jet compressor pump to the feed water inlet of the second vapor jet compressor pump; operative connection of the low pressure vapor inlets of at least one of the vapor jet compressor pumps to the second source of heated vapor; and operative connection of the discharge outlet of the second vapor jet compressor pump a heat transfer loop including to the feed water inlet of the first vapor jet compressor pump.

According to another embodiment of the invention, an auxiliary heat source is operatively connected to the motive vapor inlet of the first vapor jet compressor pump.

Pursuant to a feature of the present invention, the thermal barrier solar collector comprises a cover glass plate, a thermal loss barrier, a louvered plate, and an absorber plate. The thermal loss barrier comprises two plates enclosing a thin layer of heat transfer fluid and acts as a barrier to heat loss through convection and radiation from the high temperature absorber plate. The plates may be made of materials other than glass that are transparent to solar radiation. Evaporator tubes disposed with the thermal barrier absorb this heat that would otherwise be lost and provide low pressure, low temperature vapor for the low pressure vapor inlet of a heat pump, such as a vapor jet compressor pump.

Pursuant to a further feature of the present invention, the thermal barrier solar collector is combined with two vapor jet compressor pumps. The first vapor jet compressor pump is motivated by the heated vapor from the collector's absorber plate and acts to boost the feedwater flow through the second vapor jet compressor pump. The second pump acts as a heat pump for the vapor in the thermal barrier section of the collector.

Pursuant to another embodiment of the invention, a single vapor jet compressor pump with dual, e.g., concentric, steam inlet nozzles is utilized. The outer annular nozzle preferably is charged by a conventional auxiliary steam generator while the inner nozzle is charged by the heated vapor from the absorber plate of the thermal barrier solar collector. Alternatively, these connections may be reversed.

Pursuant to another embodiment of the present invention, a separately energized circulation pump is utilized to increase flow through the vapor jet compressor pump and thus improve start-up of the system and avoid any instability problems.

The invention is also directed to a method for using solar energy to heat space, comprising the steps of collecting solar energy in a high-temperature vapor and a low-temperature vapor; expanding the high-temperature vapor in a vapor jet compressor pump disposed within a discharge heat exchanger's heat transfer loop; compressing and condensing the low-temperature vapor in a vapor jet compressor pump; and passing the vapor jet compressor pump discharge through the discharge heat exchanger.

BRIEF DESCRIPTION OF THE DRAWING

FIG. 3 is a diagram schematically illustrating the single vapor jet compressor pump embodiment of the present invention, with valve positions (a) signifying a heating mode and valve positions (b) signifying a cooling mode.

FIG. 4 is a partial cross sectional view of an embodiment of the nozzles of the vapor jet compressor pump of FIG. 3.

DETAILED DESCRIPTION

Figure 1:
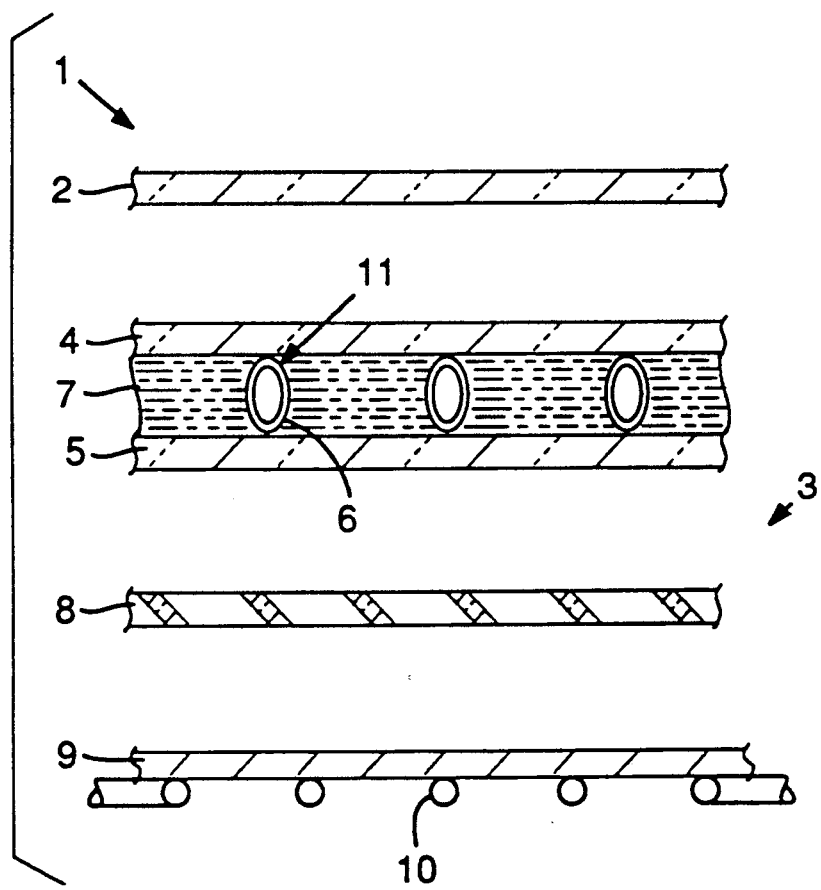
FIG. 1 is a diagram schematically illustrating an embodiment of the thermal tarrier solar collector of the present invention.

FIG. 1 depicts a flat plate collector 1 which is modified for use with a vapor jet compressor pump system. Solar radiation $Q_o$ enters through the cover glass 2, passes through a thermal barrier 3, then on through a louvered glass plate 8 to a typical black absorber plate 9. The solar radiation is converted into thermal energy by the absorber plate 9 and a fraction of this energy is removed by heat transfer medium circulating through heat transfer tubes 10 attached to the plate 9. The remaining fraction of the thermal energy is transmitted back to the louvered plate 8 by means of convection and radiation. Glass is normally opaque to thermal radiation hence the louvered plate 8 absorbs both the convected and radiated thermal energy. The thermal energy received by the louvered plate 8 is in turn radiated and convected to the colder thermal loss barrier plate 3 which absorbs a portion of the energy and transmits the remainder to the colder cover glass 2. The thermal energy absorbed by the fluid 7 in the barrier 3 is removed by evaporation of the heat transfer medium in the enclosed tubes 6 that are connected to the low pressure side of a vapor jet compressor pump or other heat pump. The vapor is compressed by the vapor jet compressor pump and delivered by it at a higher temperature suitable for effecting heat transfer for heating space. The vapor produced by the barrier 3 is shown as the supply to the low pressure inlet to the vapor jet compressor pump at the top of FIG. 2.

A portion of the incident solar radiation is absorbed by the thin layer of clear fluid 7 between the glass covers 4 and 5 of the barrier 3. However, the index of refraction of the fluid, about eliminate reflection losses at the liquid-glass interfaces. The transmitted solar energy is therefore about equivalent to that passing through a single pane of glass. The evaporator tubes 6 in the barrier 3 have a highly reflective coating 11 on the upper side so as to reflect solar radiation on down into the collector 1. The tubes 6 are also shaped so as to minimize solar-to-thermal energy conversion.

The louvered glass plate 8 above the absorber plate 9 can be positioned so as to adjust its thermal resistance since it may be necessary to vary the heat being transmitted from the absorber plate in order to achieve optimal performance. The louvers may be operated automatically by means of a bi-metallic spring device (not shown) such as conventionally used for such purposes.

Except for the top cover glass 2, the entire assembly is surrounded by thermal insulation (not shown). Assuming that the heat loss through this insulation is comparatively negligible to that through the cover glass 2, it becomes apparent that the only loss from the collector 1 is from reflected solar energy, $Q_{ref}$ and the convection and radiation losses $Q_c$ and $Q_r$ from the cover plate 2. Radiation and convection losses are small compared to conventional flat plate design because the source of the losses is the low temperature thermal barrier 3 instead of the hot absorber plate 9 of typical collectors.

When the motive steam, $Q_s$, is not sufficient for pumping all the heat generated in the barrier 3, either the louver is closed so as to increase $Q_s$ or decrease the amount of energy absorbed by the heat transfer medium in the tubes 6, $Q_e$, or an auxiliary supply of steam is used to provide an additional supply to the vapor jet compressor pump for pumping, as described below, all the heat generated in the barrier 3. Therefore, all the heat collected is used for heating space.

Some of the incident solar radiation is absorbed by the glass 2, 4 and 5. A portion of this radiation heats the glass and is ultimately absorbed by the barrier 3. The unconverted reflected radiation, $Q_{ref}$ escapes from the collector 1. The barrier 3 operates at low temperatures and pressure, therefore less costly plastic having internal moulded coolant channels can be substituted for the glass and metal coolant channels.

The thermal barrier 3 intercepts a large fraction or all of the normal heat loss flow to the outside environment. This heat loss is captured and then increased in temperature by means of a heat pump so as to be useful for space heating. The thermal barrier acts as a low pressure heat source and a source of heated vapor at a relatively low temperature. The remainder of the solar heat that is not lost to the outside is normally at the useful higher temperatures of conventional flat plate solar collectors and is used for separate energy demands.

The collector 1 accordingly supplies energy at two different temperature levels. The energy supplied at the higher level of temperature as used to motivate a heat pump to raise the temperature of the energy supplied at the lower temperature so as to deliver both energy supplies at a temperature level useful for space heating. The heat pump action may be provided by the vapor jet compressor pump. The efficiency of solar heat collection resulting from collection of the heat at two different temperature levels and raising the average temperature to useful levels is expected to be more than twice that of conventional solar heat collectors.

Two vapor jet compressor pump concepts for heating and cooling space are described which use an auxiliary heat source, such as natural gas or fuel oil, and a solar supply of thermal energy. The two energy sources are used either separately or in parallel depending on the availability of solar energy. The combination of these heat sources ensures the heating or cooling of space on demand and yet utilizing 70% or more of the total solar radiation that enters the cover plate 2.

The '523 patent specification, incorporated herein, describes the basic operating principles of vapor jet compressor pump heating and cooling systems energized by a single thermal source of energy such as from solar radiation. This section presents two concepts of the vapor jet compressor pump system using solar radiator and/or conventional fossil fuel heat sources in combination or separately so as to ensure heating and cooling at all times on demand.

Figure 2:
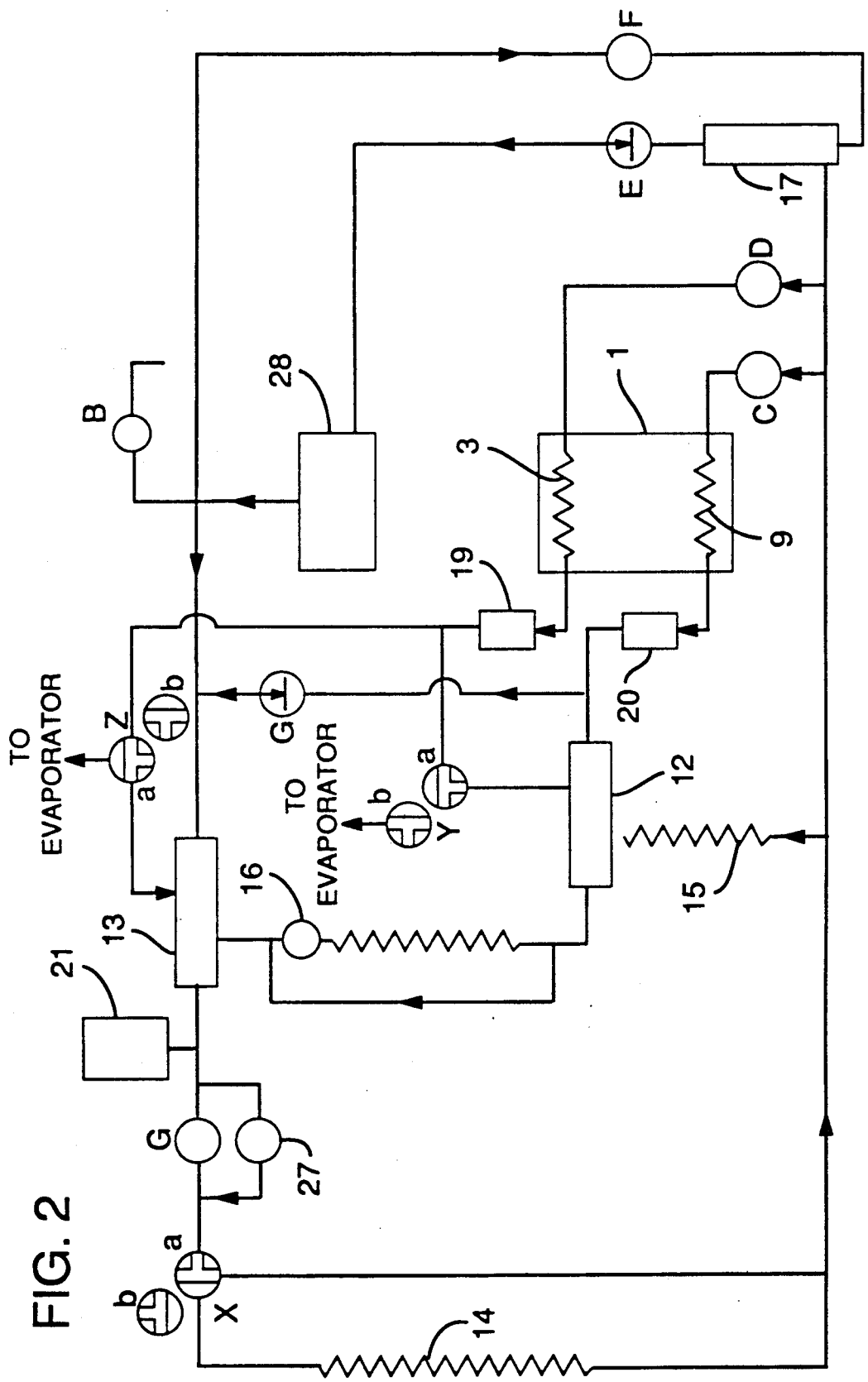
FIG. 2 is a diagram schematically illustrating the dual vapor jet compressor pump embodiment of the present invention, with valve positions (a) signifying a heating mode and valve positions (b) signifying a cooling mode.

FIG. 2 is a schematic diagram of the dual vapor jet compressor pump Heating system showing valves in position (a) for the space heating mode of operation. The alternate valve position (b) converts the system into the space cooling mode.

A first vapor jet compressor pump 12 has its motive vapor inlet connected to the absorber plate 9 of the thermal barrier solar collector 1 by means of steam separator 20; its low pressure vapor inlet connected to either the thermal barrier 3 of the collector 1 by means of steam separator 19 and valve Y or to the evaporator (not shown) by means of valve Y. Discharge heat exchanger 15 provides cooled heat transfer fluid medium, such as feedwater, to the first vapor jet compressor pump 12. Pump 12 discharges into the feed liquid inlet of the second vapor jet compressor pump 13 by means of a thermostat control 16.

The second vapor jet compressor pump 13 has its motive vapor inlet connected to either the absorber plate 9 by means of steam separator 20 and check valve G or to an auxiliary source of steam 28. The auxiliary source of steam 28 can be any non-solar source, for example a fuel oil or natural gas source. When it is cycled on by conventional controls, steam generator 28 supplies motive steam for vapor jet compressor pump 13.

A step-by-step description of the system's operation follows for the solar only case; for operation with solar and conventional heat sources in parallel; and for operation solely energized by conventional energy sources such as gas or fuel oil. The system descriptions assume operation in conjunction with solar collector 1 shown on FIG. 1, however the self-alligning collector 1 of applicant's U.S. Pat. No. 4,809,523 also applies.

The solar-energy only mode of operation is as follows:

(a) solar radiation heats collector 1's barrier 3 and absorber plate 9;

(b) first vapor jet compressor pump 12 and second vapor jet compressor pump 13 are activated and perform in accordance with the operation described in U.S. Pat. No. 4,809,523;

(c) vapor jet compressor pump 12 discharges into vapor jet compressor pump 13 which boosts the flow through the heat exchanger 15;

(d) cooled feedwater returns to vapor jet compressor pump 12 to complete the cycle;

(e) level control valves C and D operate as required in order to maintain liquid levels in the collector 1.

Operation of the solar collector and the auxiliary steam generator supply in parallel is as follows:

(a) there is a demand for heat that the solar energy supply cannot alone satisfy;

(b) conventional heating system thermostat and controls initiate combustion of fuel to heat the steam generator;

(c) steam generator pressure increases causing check valve G to shut;

(d) vapor jet compressor pump 13 is motivated by vapor from steam generator 28 and compresses vapor from barrier 3 to remove heat from it. The high pressure steam from the steam generator 28 incidentally may cool barrier 3 to low temperatures increasing the efficiency of the solar collector 1;

(e) vapor jet compressor pump 13 pumps the heated heat transfer fluid (e.g., water) through the discharge heat exchanger 15 and the cooled water enters vapor jet compressor pump 12;

(f) motive vapor from the absorber plate 9 of the collector 1 activates vapor jet compressor pump 12 boosting flow to vapor jet compressor pump 13. Flow of steam from the absorber plate 9 continues until its temperature is the same as the feed water because of the venturi effect of the flow produced by vapor jet compressor pump 13, therefore both the barrier 3 and absorber plate 9 in this instance become low temperature heat sources to supply the vapor jet compressor pump 13 heat pumping action;

(g) if solar radiation intensity increases, the motive steam from the absorber plate 9 supports the flow and heat production in parallel with the auxiliary supply 28;

(h) if solar energy alone can satisfy the heat demand, the auxiliary supply 28 shuts down as a result of thermosat 16 action;

(i) if the demand for all heating ends, the excess solar heat can be either dumped through valve X into the outside heat exchanger 14 used for rejecting heat during the cooling mode of operation, or it can be stored for instance, in a hot water tank (not shown) using conventional controls for this purpose;

(j) level control valves C and D operate as required to maintain liquid levels in the collector 1;

(k) level control valve F opens when the level in the steam generator 28 is low so as to supply motive steam to the injector 17 which charges feedwater into the high pressure steam generator 28. Valve 8 relieves accidental overpressure.

In the auxiliary steam supply only mode of operation, steps (a) to (f) immediately above govern.

In an alternative embodiment, the heat storage means, such as a water tank, is operatively connected to the low pressure vapor inlet of one or more vapor jet compressor pumps whereby the solar energy stored therein may be converted to high temperature energy useful for space heating even at water tank temperatures as low as about 40° F. In other words, the heat storage means is substituted for the thermal barrier of the solar collector as the source of low temperature heat. Thus, the steam generator 28 and vapor jet compressor pumps combine to allow a greater percentage of the storage means' heat capacity to be used for space heating. As a result, for example, a smaller storage tank may be used.

The dual vapor jet compressor pump cooling cycle is now described. For cooling, valves X, Y and Z are turned to the (b) position so as to isolate the barrier 3 in the collector 1 and pump vapor from an evaporator (not shown) located inside the space to be cooled. Valve positions (b) are indicated on the schematic diagram, FIG. 2, for the cooling mode of operation. In this mode, the suction produced by the vapor jet compressor pumps 12 and 13 are connected to tho evaporator (not shown) which provides the required cooling of space. The thermal barrier 3 in the collector 1 is not connected to the vapor jet compressor pumps 12 and 13 directly.

By means of valves (not shown) the discharge heat exchanger 15 can be converted into an evaporator. The heat absorbed by the evaporator is discharged by the outside heat exchanger 14 that is connected to the system when valve X is turned to the (b) position.

The system can be modified to reflect a 3-stage concept in which during hot summer weather when there is a demand for cooling of space, the barrier 3 temperature can be permitted to rise sufficiently for generating useful motive steam at, for instance, 170° F. or more to supplement the steam from the absorber plate 9.

The single vapor jet compressor pump heating system of FIG. 3 is now described. FIG. 3 is a schematic diagram of a dual nozzle vapor jet compressor pump system, which in one embodiment includes concentric steam nozzle 23 shown enlarged on FIG. 4. The dual concentric nozzle 23 eliminates the need for vapor jet compressor pump 12 shown on FIG. 2. A pop-valve A, which opens at a pre-set pressure, is also added to the motive steam line between the steam generator 28 and the dual steam nozzle 23. The pop-valve A is introduced as a means for overcoming any start-up uncertainty, if such becomes a problem.

When the pop-valve A is opened, steam from the steam generator 28 preferably jets from the outer, annular nozzle 24. The center nozzle 25 is connected to the absorber plate 9 steam source. Normally the annular jet will have the highest velocity since the steam generator 28 operates at high pressures compared to those produced in the solar collector 1. The high velocity steam generator 28 jet will therefore entrain steam from the absorber plate 9. Similarly, the outside surface of the steam generator 28 jet will entrain vapor from the barrier 3. This nozzle configuration 23 causes the motive steam from the absorber plate 9 to contribute to vapor jet compressor pump action at all absorber steam temperatures above that of the mixture of feed-water and condensate in the combining tube of the vapor jet compressor pump 22. At absorber plate 9 steam temperatures less than that of the combining tube mixture, the vapor jet compressor and the steam from the absorber plate 9 is compressed by entrainment and delivered to the combining tube for condensation. Hence, the collector 1 will continue to contribute heat until its barrier 3 and absorber plate 9 temperatures approach the freezing point of the heat transfer medium. This attribute of the system insures efficient utilization of all available direct and diffuse solar energy including albido from the surroundings. A step-by step description of system operation follows for the single vapor jet compressor pump dual nozzle heating system:

(a) space heating is desired and thermostat (not shown) is set so as to demand heat;

(b) conventional controls (not shown) start fuel combustion and heating of the steam generator 28;

(c) steam generator 28 pressure increases causing check valve E to close;

(d) pop-valve A opens at a pre-set pressure and motive steam from the steam generator 28 impacts cold vapor jet compressor pump and feedwater to initiate flow of water in system;

(e) the motive steam from the steam generator 28 starts flow of motive steam from the absorber plate 9 by initially entraining it;

(f) if solar energy from the absorber plate 9 and barrier 3 are sufficient for heating, the thermostat shuts down the auxiliary steam generator 28 supply;

(g) if the solar heat is in excess, the heat will be automatically dumped outside or stored as described above;

(h) if the solar energy can not entirely satisfy space heating requirements, the steam generator 28 controls will cycle the steam generator 28 as required for satisfying the heating demand. The high pressure steam from the steam generator 28 will continue to withdraw steam from the absorber plate 9 and the barrier 3 by the entrainment process;

(i) level control valves C and D operate as required in order to maintain required liquid levels in the collector 1;

(j) level control valve F opens when the level in the steam generator 28 is low. Valve F connects the steam generator 28 steam supply to an injector 17 which charges water into the high pressure steam generator 28. Check valve E and the steam nozzle 23 isolate the remainder of the system from steam generator 28 pressure.

The single vapor jet compressor pump dual nozzle cooling system operates the same as for the dual vapor jet compressor pump cooling system described above.

It has been a design objective to make the vapor jet compressor pump system entirely self energized and independent of outside sources of energy such as electrical power so that it can be used in undeveloped areas where neither electrical power or operative and maintenance skills are available. However the instability of vapor-et vacuum pumps, as conventionally used, is well known and it limits operation to a relatively narrow band of pressure and temperatures compared to other methods of refrigeration. The vapor jet compressor pump system is also subject to the same limitations. If indeed start-up and instability are shown to be a problem during subsequent development efforts, the self-energized requirement may be waived and a small electrically driven circulating pump, for instance, can be included in parallel with the feed water supply to the vapor jet compressor pump so as to force water through it at start-up or at the approach to instability.

A separately energized circulation pump 27 may be activated by an independent (electrical) source. The separately energized circulation pump 27 causes valve G to close to prevent recirculation around the pump 27. The pump 27 also operates in series with the vapor jet compressor pump hence is relieved of conditions, the vapor jet compressor pump 22 provides ample pumping power hence appropriate controls discontinue use of the separately excited pump 27 and check valve G automatically opens to permit the vapor jet compressor pump to provide all the energy required for circulation.

In the case in which the auxiliary energy supply 27 is not activated, the nozzle arrangement simply reduces the pressure in the auxiliary energy supply line to pop valve A. The check valve G opens so that the self-energized flow produced by the vapor jet compressor pump 22 by-passes the separately energized circulation pump 27 which is not operating in this mode of operation.

The combination of the thermal barrier solar collector 1, auxiliary energy supply 28 and the vapor jet compressor pump 22 is brought into operation by means of suitable controls when available solar energy is not adequate for supplying the heating or cooling requirements.

In the heating mode, vapor is generated in either the auxiliary supply 28 or the motive steam generator 9 of the thermal barrier solar collector 1 or both in parallel to motivate the vapor jet compressor pump 22. The vapor jet compressor pump 22 in turn pumps heat from the thermal barrier 3 of the solar collector 1. The vapor condenses in the the vapor jet compressor pump, provides vapor jet compressor pump 22 pumping energy, and heats the heat transfer medium which discharges from the vapor jet compressor pump and by-passes the non-operating circulation pump 27 to discharge useful heat into the discharge heat exchanger 15. The cooled heat transfer medium returns to the vapor jet compressor pump 22 to complete the cycle. The valve positions for the cooling mode are indicated as (b) on the schematic diagram of FIG. 3. In the cooling mode the evaporator instead of the thermal barrier 3 is connected to the vacuum side of the vapor jet compressor pump 22.

When available solar energy is not adequate for supplying heating or cooling needs, the thermal barrier solar collector 1, vapor jet compressor pump 22, auxiliary energy supply 28 and separately energized pump 27 may be combined. For heating purposes, vapor is generated in either the auxiliary supply 28 or the motive steam generator portion 9 of the solar collector 1 or by both in parallel to motivate the vapor jet compressor pump 22. The vapor jet compressor pump 22 in turn pumps heat from the thermal barrier 3 of the thermal barrier solar collector 1. The vapor condenses in the vapor jet compressor pump, provides pumping energy, heats the heat transfer medium which is discharged from the vapor jet compressor pump 22 into the suction side of the separately energized pump 27. The pump 27 controls the flow of the heat transfer medium, and ensures start-up, and flow stablity. If the vapor jet compressor pump 22 provides adequate circulation for the heating or cooling demand, the pump 27 is stopped by suitable controls and the check valve G, and opens to permit by-pass flow from the vapor jet compressor pump around the pump. The discharge from the pump 27 or vapor jet compressor pump 22 enters the discharge heat exchanger 15 where the heat transfer medium is cooled and returned again to the vapor jet compressor pump 22 to complete the cycle.

In the cooling mode of operation, the evaporator instead of the thermal barrier 3, is connected to the vacuum side of the vapor jet compressor pump 22.

Although the invention has been described in terms of specific embodiments and applications, one of ordinary skill in the art, in light of this teaching, can generate additional embodiments and modifications without departing from the spirit of the invention. Accordingly, it is to be understood that the descriptions and illustrations herein are proffered to facilitate comprehension of the invention and should not be taken to limit the scope thereof.

What is claimed is:

1. Heat transfer apparatus comprising:
   (a) a first vapor jet compressor pump having a motive vapor inlet, a feed liquid inlet, a low pressure vapor inlet and a discharge outlet;
   (b) a second vapor jet compressor pump having a motive vapor inlet, a feed liquid inlet, a low pressure vapor inlet and a discharge outlet;
   (c) means for providing a first source of heated vapor at a relatively high temperature;
   (d) a low pressure vapor source;
   (e) means for operatively connecting the motive vapor inlets of the first and second vapor jet compressor pumps to the first source of heated vapor of means (c);
   (f) means for operatively connecting the discharge outlet of the first vapor jet compressor pump to the feed liquid inlet of the second vapor jet compressor pump;
   (g) means for operatively connecting the low pressure vapor inlet of at least one of the first and second vapor jet compressor pumps to the low pressure vapor source; and
   (h) means for operatively connecting the discharge outlet of the second vapor jet compressor pump to a heat transfer loop for fluid heat transfer medium including the feed liquid inlet of the first vapor jet compressor pump.

2. The apparatus of claim 1 wherein means (c) further provides a second source of heated vapor at a relatively low temperature.

3. The apparatus of claim 2 wherein the low pressure vapor source is the second source of heated vapor of means (c).

4. The apparatus of claim 2 wherein the low pressure vapor source is an evaporator for cooling space.

5. The apparatus of claim 2 wherein the low pressure vapor source is a tank for storing heat.

6. The apparatus of claim 1 further comprising:
   (i) a separately energized circulating pump disposed within the heat transfer loop for selectively pumping heat transfer fluid through the loop.

7. The apparatus of claim 6 wherein the separately energized circulating pump is disposed between the discharge outlet of the second vapor jet compressor pump and the feed liquid inlet of the first vapor jet compressor pump.

8. The apparatus of claim 1 further comprising:
   (j) an auxiliary heat source operatively connected to the motive vapor inlet of the second vapor jet compressor pump.

9. The apparatus of claim 2 wherein means (c) comprises a thermal barrier solar collector which comprises
   (i) a heat transfer tube for providing heated vapor at a relatively high temperature;
   (ii) an evaporator tube for providing a second source of heated vapor at a relatively low temperature;
   (iii) an opaque absorber plate operatively connected to the heat transfer tube;
   (iv) a thermal barrier plate operatively connected to the evaporator tube;
   (v) a louvered glass plate disposed between the absorber plate and the thermal barrier plate; and
   (vi) a glass cover plate for transmitting solar radiation into the collector.

10. A solar heat transfer system comprising:
    (a) a thermal barrier solar collector which comprises
        (i) a heat transfer tube;
        (ii) an evaporator tube;
        (iii) an opaque absorber plate operatively connected to the heat transfer tube;
        (iv) a thermal barrier plate operatively connected to the evaporator tube;
        (v) a louvered glass plate disposed between the absorber plate and the thermal barrier plate;
        (vi) a glass cover plate for transmitting solar radiation into the collector;
    (b) means for discharging heat from heat transfer fluid disposed within the heat transfer tube; and
    (c) means for pumping in a heat pump heat from heat transfer fluid disposed in the evaporator tube.

11. Heat transfer apparatus comprising:
    (a) means for converting solar energy to a first stream of motive vapor;
    (b) a source of a second stream of motive vapor; and
    (c) a vapor jet compressor pump having at least an inlet for liquid heat transfer medium and two motive vapor inlet nozzles, a first nozzle being operatively connected to source (b) and a second nozzle being operatively connected to means (a).

12. The heat transfer apparatus of claim 11 wherein the first and second nozzles are concentric.

13. The heat transfer apparatus of claim 12 wherein the first nozzle is an outer annular nozzle and the second nozzle is an inner nozzle.

14. The heat transfer apparatus of claim 12 wherein the second nozzle is an outer annular nozzle and the first nozzle is an inner nozzle.

15. The apparatus of claim 11 further comprising:
(d) a separately energized circulating pump operatively connected to the vapor jet compressor pump for selectively pumping heat transfer fluid through the vapor jet compressor pump.

* * * * *